US012035447B2

United States Patent
Givens et al.

(10) Patent No.: US 12,035,447 B2
(45) Date of Patent: Jul. 9, 2024

(54) PACKAGED FOOD PRODUCT MICROWAVE SYSTEM AND METHOD

(71) Applicant: THE COCA-COLA COMPANY, Atlanta, GA (US)

(72) Inventors: Steven Romel Givens, Atlanta, GA (US); Clayton Keith Burnett, Atlanta, GA (US); Ryan West, Newnan, GA (US); Michael J. Goclon, Atlanta, GA (US); John Foster Gerling, Modesto, CA (US); George Clarke Monroe, IV, Kennesaw, GA (US)

(73) Assignee: The Coca-Cola Company, Atlanta, GA (US)

( * ) Notice: Subject to any disclaimer, the term of this patent is extended or adjusted under 35 U.S.C. 154(b) by 687 days.

(21) Appl. No.: 17/276,525

(22) PCT Filed: Sep. 17, 2019

(86) PCT No.: PCT/US2019/051519
§ 371 (c)(1),
(2) Date: Mar. 16, 2021

(87) PCT Pub. No.: WO2020/061049
PCT Pub. Date: Mar. 26, 2020

(65) Prior Publication Data
US 2022/0039219 A1 Feb. 3, 2022

Related U.S. Application Data

(60) Provisional application No. 62/732,183, filed on Sep. 17, 2018.

(51) Int. Cl.
*H05B 6/64* (2006.01)
*H05B 6/66* (2006.01)
*H05B 6/68* (2006.01)

(52) U.S. Cl.
CPC ......... *H05B 6/6447* (2013.01); *H05B 6/6441* (2013.01); *H05B 6/645* (2013.01);
(Continued)

(58) Field of Classification Search
CPC ............ H05B 2206/044; H05B 6/6426; H05B 6/6441; H05B 6/6447; H05B 6/645; H05B 6/664; H05B 6/686
(Continued)

(56) References Cited

U.S. PATENT DOCUMENTS

2010/0176121 A1* 7/2010 Nobue .................. H05B 6/686
219/716
2010/0187224 A1 7/2010 Hyde et al.
(Continued)

FOREIGN PATENT DOCUMENTS

EP 2674013 B1 5/2017
JP H0589957 A 4/1993
(Continued)

OTHER PUBLICATIONS

International Search Report and Written Opinion for International Application No. PCT/US2019/051519 dated Jan. 17, 2020.
Extended European Search Report, mailed May 11, 2022, received in connection with corresponding EP Patent Application No. 19861651.8.
Office Action received in connection with JP Application No. 2021-514345, dated Jun. 13, 2023, 10 pages.
English translation of Office Action issued in JP 2021-514345, mailed Dec. 11, 2023.

*Primary Examiner* — Quang T Van
(74) *Attorney, Agent, or Firm* — Meunier Carlin & Curfman LLC

(57) ABSTRACT

A microwave appliance provides safe heating of packaged food products at an efficiency greater than 90%. A temperature sensor positioned about a product holder is configured to sense a temperature of the package. A product identification scanner identifies a type of food product, a type of packaging, and/or a size of packaging being inserted into the microwave appliance. The product identification may be used to obtain a dielectric constant and/or electrical conduc-
(Continued)

tivity of the product. An electric field detector verifies that a suitable product has been inserted into the microwave appliance and is used to estimate a volume of the packaged food product. Accordingly, even partially full packaged food products may be safely re-heated to a desired temperature. As opposed to a time-based operation with traditional microwave appliances, operation of the microwave appliance may be adjusted based on the product identification scanner, temperature sensor, and electric field detector.

18 Claims, 11 Drawing Sheets

(52) U.S. Cl.
CPC ............. *H05B 6/664* (2013.01); *H05B 6/686* (2013.01); *H05B 2206/044* (2013.01)

(58) Field of Classification Search
USPC ....... 219/705, 702, 704, 708, 709, 710, 711, 219/712, 713, 715, 716, 717, 736, 761
See application file for complete search history.

(56) References Cited

U.S. PATENT DOCUMENTS

| | | | |
|---|---|---|---|
| 2010/0213187 A1* | 8/2010 | Bandholz | ............. H05B 6/6441 219/506 |
| 2011/0297672 A1* | 12/2011 | Niklasson | ............ H05B 6/6447 219/702 |
| 2016/0249416 A1 | 8/2016 | Elboim et al. | |
| 2016/0302265 A1 | 10/2016 | Kreiner | |
| 2017/0074522 A1 | 3/2017 | Cheng | |

FOREIGN PATENT DOCUMENTS

| | | | |
|---|---|---|---|
| JP | 2003106532 A | | 4/2003 |
| JP | 2017-053533 A | | 3/2017 |
| KR | 10-2015-0136781 A | | 12/2015 |
| KR | 10-2017-0043230 A | | 4/2017 |
| TW | 1413760 B | * | 11/2013 |

* cited by examiner

PACKAGED FOOD PRODUCT MICROWAVE SYSTEM AND METHOD

CROSS REFERENCE TO RELATED APPLICATIONS

This application is a national stage application filed under 35 U.S.C. § 371 of PCT/US2019/051519 on Sep. 17, 2019, which claims the benefit of U.S. Provisional Patent Application Ser. No. 62/732,183 filed Sep. 17, 2018, the disclosures of which are expressly incorporated herein by reference.

BACKGROUND

Typical consumer microwaves are designed for heating of a large variety of food products. Accordingly, the efficiency of consumer microwaves is typically around 64%. Additionally, typical microwaves do not have safety features that can facilitate use of the microwave with an enclosed package while preventing rupture of the enclosed package. Such enclosed packages can unexpectedly rupture as a result of prolonged operation of the microwave. Accordingly, opened, vented, or otherwise unsealed food containers or packaging are used in typical microwaves. Therefore, typical microwaves may be exposed to splatter of food products from the opened food containers during use.

SUMMARY

A first aspect of the disclosure provides a microwave appliance comprising a plurality of microwave sources. The microwave appliance also comprises a microwave chamber in electromagnetic communication with the plurality of microwave sources and a product holder configured to support a food container within the microwave chamber. The microwave appliance also comprises a temperature sensor configured to sense a temperature of the food container supported within the product holder and a user interface configured to receive a temperature selection. The microwave appliance also comprises a controller in communication with the temperature sensor and the user interface configured to operate the plurality of microwave sources to heat a food product in the food container to a temperature corresponding to the temperature selection.

In some implementations of the first aspect of the disclosure, the microwave appliance further comprises an electric field detector in communication with the controller, the electric field detector configured to detect an electric field in the microwave chamber.

In some implementations of the first aspect of the disclosure, the controller is configured to determine whether the electric field in the microwave chamber is less than a maximum electric field threshold value.

In some implementations of the first aspect of the disclosure, the microwave appliance further comprises a product identification scanner in communication with the controller and configured read an identifier on the food container.

In some implementations of the first aspect of the disclosure, the controller is configured to determine a volume of the food product in the microwave chamber based on a reading from the electric field detector and a reading of the identifier from the product identification scanner.

In some implementations of the first aspect of the disclosure, the product identification scanner is an optical scanner or a wireless tag reader. The optical scanner is a camera or barcode reader.

In some implementations of the first aspect of the disclosure, the temperature sensor is positioned beneath the product holder and configured to sense a temperature of a base of the food container.

In some implementations of the first aspect of the disclosure, the temperature sensor is an infrared or ultrasonic temperature sensor.

In some implementations of the first aspect of the disclosure, the microwave appliance further comprises a plurality of power supplies, each corresponding to one of the plurality of microwave sources, and each in communication with the controller. The controller is further configured to modulate a power level of microwave generated by the plurality of microwave sources.

In some implementations of the first aspect of the disclosure, one or more of the plurality of microwave sources is a magnetron or a solid-state microwave source.

In some implementations of the first aspect of the disclosure, the controller is further configured to modulate a frequency of microwave generated by the solid-state microwave source.

A second aspect of the disclosure provides a method of operating a microwave appliance. The method comprises identifying a food container based on scanning an identifier on the food container by a product identification scanner. The method comprises receiving a temperature selection from a user interface. The method comprises powering a plurality of microwave sources to heat a food product in a food container within a microwave chamber. The method comprises sensing a temperature of the food container with a temperature sensor. The method comprises turning off power to the plurality of microwave sources upon the temperature of the food container reaching the temperature selection.

In some implementations of the second aspect of the disclosure, the method further comprises detecting an electric field in the microwave chamber with an electric field detector.

In some implementations of the second aspect of the disclosure, the method further comprises determining whether the electric field in the microwave chamber is greater than a maximum electric field threshold value.

In some implementations of the second aspect of the disclosure, the method further comprises determining a volume of the food product in the microwave chamber based on the electric field detected by the electric field detector and the identification of the food container.

In some implementations of the second aspect of the disclosure, the method further comprises modifying a power level of one or more of the plurality of microwave sources based on the determined volume of the food product.

In some implementations of the second aspect of the disclosure, the temperature sensor is positioned beneath the food container in the microwave chamber and is configured to sense the temperature of a base of the food container.

In some implementations of the second aspect of the disclosure, the product identification scanner is an optical scanner or a wireless tag reader.

In some implementations of the second aspect of the disclosure, one or more of the plurality of microwave sources is a magnetron or a solid-state microwave source.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
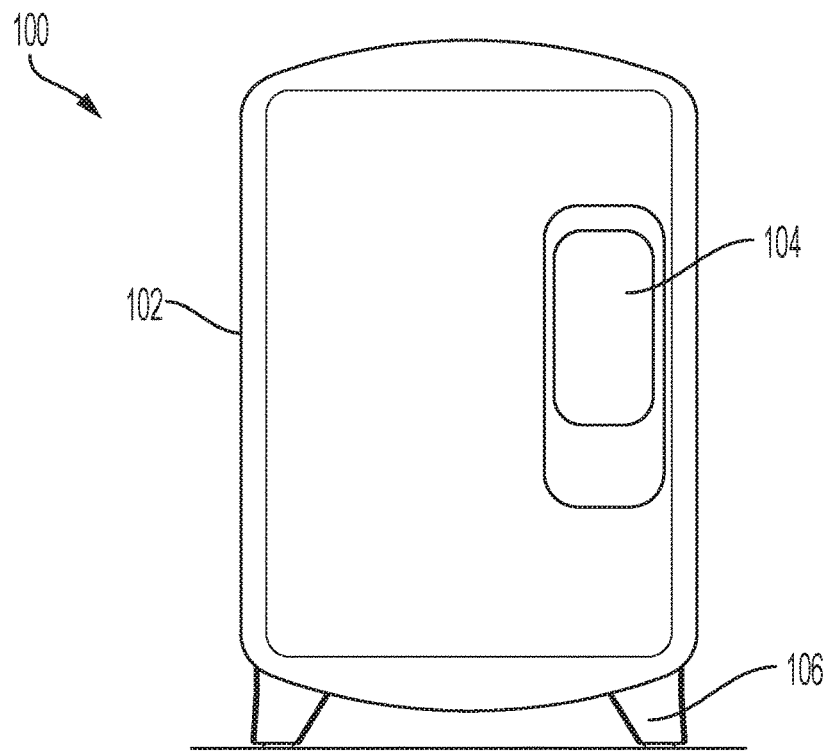
FIG. 1 is a front view of a microwave appliance for heating packaged food products to a desired temperature.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents. Use of the phrase "and/or" indicates that any one or any combination of a list of options can be used. For example, "A, B, and/or C" means "A", or "B", or "C", or "A and B", or "A and C", or "B and C", or "A and B and C".

A microwave appliance is disclosed herein to facilitate reliable and efficient heating of packaged food products. For example, the microwave appliance may have an efficiency greater than 90% for packaged food products such as beverage bottles or soup containers. The packaged food products may include teas, coffees, dairy-based beverages, waters, soups, or other flowable packaged food products. In some implementations, carbonated or lightly carbonated food products (e.g., about 1-8 volumes of $CO_2$) may be used. In some implementations other packaged or non-packaged food products may be used.

The microwave appliance includes a product holder configured to hold a packaged food product, such as a beverage or soup container. The product holder may be sized to receive a single product or a plurality of products. In some implementations, the product holder may be a rack configured to position or receive a plurality of packaged food products.

A temperature sensor is configured to sense a temperature of the packaged food product. In some implementations, the temperature sensor is a contactless temperature sensor configured to sense a temperature of the packaged food product from outside of a microwave chamber. Using a contactless temperature sensor prevents interaction between the temperature sensor and microwave radiation used in heating the packaged food product. For example, the temperature sensor may be an infrared temperature sensor arranged to sense infrared radiation emitted by the packaged food product. In another example, an ultrasound sensor may be used to sense a temperature of the packaged food product. Other contact-based or contactless temperature sensors may be used.

To provide a more accurate temperature reading, the temperature sensor may be arranged relative to the packaged food product to avoid sensing a temperature about a product label. The product label may insulate or otherwise impact a temperature reading for the packaged food product. Accordingly, in some implementations, an infrared temperature sensor is arranged about a bottom of the packaged food product. Measuring the temperature from the bottom of the packaged food product allows for accurately sensing a temperature of a greater variety of package types by not needing to take into account different package sizes, shapes, and product label positions.

As opposed to a time-based operation as with traditional microwave appliances, operation of the disclosed microwave appliance may be based on the measured temperature of the packaged food product determined by the temperature sensor. In use, a consumer may select a desired product temperature. The desired product temperature may be an absolute temperature input received via input on a user interface (e.g., 52° C.) or a relative temperature input (e.g., ambient, hot, very hot) received via input on the user interface. The relative temperature inputs may be configurable by a technician to a particular set point (e.g., an ambient selection corresponds to 25° C., a hot selection corresponds to 55° C., etc.). The temperature-based operation of the microwave appliance may be used with a variety of sizes and types of packaged food products while ensuring that a product is not overheated in use. Additionally, a packaged food product may be re-heated or a partially filled packaged food product may be safely heated to the desired product temperature. A maximum operation time may also be used as a fail safe against failure of the temperature sensor.

The microwave appliance also includes a product identification scanner for identifying a type of food product, a type of packaging, and/or a size of packaging being inserted into the microwave appliance. For example, the product identification scanner may be a barcode reader, camera, RFID reader or the like. In some implementations, the product holder may include a turntable for rotating the packaged food product about the product identification scanner to facilitate identification of the package food product. Based on the identification of the type of food product inserted, the microwave appliance may identify the dielectric constant and/or electrical conductivity of the food product and adjust operation of the microwave appliance accordingly. For example, a power level of the microwave may be adjusted based on the dielectric constant and/or electrical conductivity of the food product inserted into the microwave appliance.

In addition to the product identification scanner, the microwave appliance may include a proximity or presence detector. The proximity or presence detector may be positioned relative to the product holder to confirm that a product is located within the product holder prior to operation of the microwave appliance. For example, a product may initially be scanned by the product identification scanner and subsequently verified to be located in the product holder based on the proximity or presence detector. The proximity or presence detector may be an optical sensor or acoustic rangefinder to detect the presence of a product in the product holder.

The microwave appliance also includes an electric field detector. Based on the identification of the dielectric constant and/or electrical conductivity of the food product inserted into the microwave appliance and based on the measurement from the electric field detector, an estimate of a volume of the product may be determined. Operation of the microwave appliance may be adjusted based on the estimated volume of the product. For example, for a packaged food product that is determined to be half full, a power level of the microwave appliance may be reduced or otherwise modified as compared to operation for a full product.

FIGS. 1-4 illustrate various views of a microwave appliance 100 suitable for heating packaged food products to a desired temperature. FIG. 1 is a front view of the microwave appliance 100 showing a door 102, a user interface 104, and support legs 106. The door 102 includes a window 112 for accessing the user interface 104 when the door 102 is closed.

Figure 2:
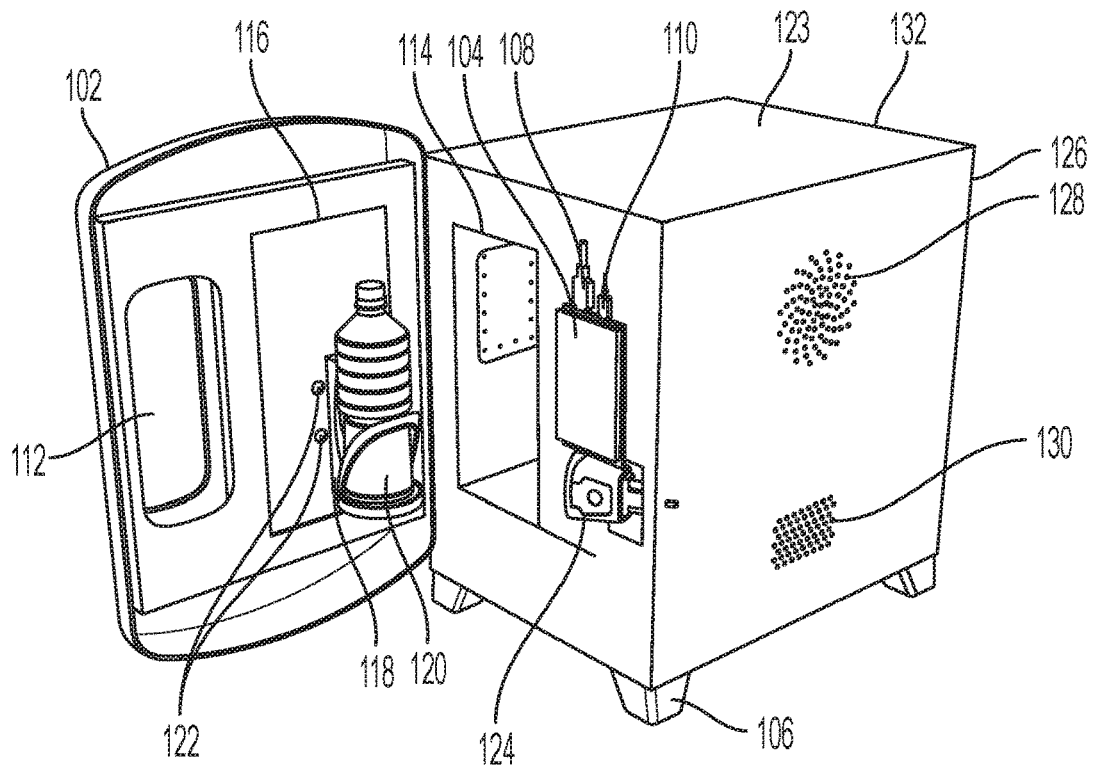
FIG. 2 is a perspective view of the microwave appliance with the door opened.

FIG. 2 is a perspective view of the microwave appliance 100 with the door 102 opened. A door switch 532 may be positioned on a front surface of a body 123 of the microwave appliance 100 or on the door 102 and provide a signal indicative of a position of the door 102 (e.g., open or closed). A holder 118 is positioned on the door and sized and shaped to receive a food container 120, such as a food or beverage container. In the example shown in FIG. 2, the food container 120 is a beverage bottle. The food container 120 may be made of plastic (e.g., polyethylene terephthalate, high density polyethylene, or the like), glass, ceramic, a non-foil lined carton, or the like. The holder 118 is positioned on the door 102 to locate the food container 120 within a microwave cavity 114 when the door 102 is closed. For example, as the door 102 is rotated to a closed position, the holder 118 passes through an opening in the microwave cavity 114 to be positioned therein.

A reactive choke 116 is positioned on the door 102 around the holder 118 about a perimeter of the opening in the microwave cavity 114 when the door 102 is closed. The reactive chock 116 prevents microwave radiation from passing through the door 102 in use. One or more product presence detectors 122 are positioned on the door 102 about the product holder 118 and are configured to confirm whether the food container 120 is located within the product holder 118. The product presence detector(s) 122 may be an optical sensor or acoustic rangefinder to detect the presence of the food container 120 in the product holder 118. A plurality of product presence detectors 122 may be used to ensure detection of various sizes of food containers 120. The plurality of product presence detectors 122 may also be used to verify a size of the food container 120.

The user interface 104 is positioned on a body 123 of the microwave appliance 100. For example, the user interface 104 is positioned on the front surface of the body 123 of the microwave appliance 100. As shown in FIG. 2, the front surface of the body of the microwave appliance 100 is the same surface that includes the opening in the microwave cavity 114. The user interface 104 may be a touchscreen user interface. The user interface 104 may include a graphics port 108, such as a high-definition multimedia interface (HDMI) port, and a data port 110, such as a universal serial bus (USB) port. The graphics port 108 may supply graphics data for display on the user interface 104. The data port 110 may communicate touch or gesture inputs registered on the touchscreen. Other user interface elements may be used and communicate via the data port 110 or another data port. For example, in a vending environment, a payment module may additionally be present to facilitate receiving payment and unlocking the door 102. Operation of the user interface 104 is described in more detail below with reference to FIGS. 7-10B A product identification scanner 124 is positioned on the body 123 of the microwave appliance 100. In the example shown in FIG. 2, the product identification scanner 124 is positioned below the user interface 104 and faces the product holder 118 when the door 102 is open. The product identification scanner 124 may be an optical scanner such as a barcode reader or camera configured to read an identifier on the food container 120. In some implementations, more than one barcode reader may be configured to read the identifier at multiple locations along the food container 120. Including multiple barcode readers facilitates identification of different food containers 120 with barcodes located at different places on the container 120 and accounts for containers 120 of varying heights.

The product holder 118 may include an opening above a base of the product holder 118 sized to facilitate a view of the identifier on the food container 120 when placed in the product holder 118. For example, the identifier may be a barcode, symbol, quick response (QR) code, or the like that encodes a universal product code (UPC) or other product identifier. The product holder 118 may be sized to allow a user to turn the food container 120 in the product holder 118 to facilitate scanning or otherwise reading the identifier on the food container 120. For example, by running the food container 120 in the product holder 118, the identifier may be located within the opening of the product holder 118 and in the view of the product identification scanner 124.

In some implementations, the product holder 118 includes a turntable on a base of the product holder 118 to facilitate easier turning of the food container 120 within the product holder 118. The turntable may be driven by a motor to automatically scan the identifier on the food container 120 within the product holder 118. The turntable motor may be activated upon the door switch providing a signal indicative of the door 102 being opened or after a predetermined delay of the door 102 being opened.

In some implementations, the identifier on the food container 120 may be scanned by the product identification scanner 124 prior to insertion into the product holder 118. In such implementations, the product presence detector(s) 122 may verify that the food container 120 has been inserted into the product holder 118 after being scanned by the product identification scanner 124.

While the product identification scanner 124 is described in an example above as an optical scanner, the product identification scanner 124 may be a wireless tag reader. For example, a wireless tag may be positioned on the food container 120, such as on a label or closure of the food container and store the identifier for the food container 120. The wireless tag may be a radio frequency identification (RFID) tag, a BLUETOOTH low energy (BLE) tag, a nearfield communication (NFC) tag, a beacon tag, or the like. The wireless tag reader of the product identification scanner 124 is configured to read the identifier for the food container 120 from the wireless tag on the food container 120.

Based on the identifier read from the food container 120 by the product identification scanner 124, the microwave appliance 100 is configured to identify a type of food product (e.g., sugar sweetened carbonated beverage, diet carbonated beverage, juice beverage, tea, coffee, smoothie, dairy beverage, yogurt product, etc.), a type of packaging (e.g., PET carbonated beverage bottle, aluminum can, aluminum bottle, hot-fill PET beverage bottle, aseptic PET beverage bottle, etc.), and/or a size of packaging (e.g., 20 fl. oz. package, 12 fl. oz. package, 8 fl. oz. package, etc.) being inserted into the microwave appliance 100. Based on the identification of the type of food product inserted, the microwave appliance 100 may identify the dielectric constant and/or electrical conductivity of the food product and adjust operation of the microwave appliance accordingly. For example, a power level of the microwave appliance 100 may be adjusted based on the dielectric constant and/or electrical conductivity of the food product. In response to reading the identifier, the microwave appliance 100 may access a local database or a network accessible database that provides one or more tables or other logical structures that associate the identifier with the type of food product, a type of packaging, a size of packaging, a dielectric constant of the food product, and/or an electrical conductivity of the food product.

The body 123 of the microwave appliance 100 comprises an electronics access panel 126 and a microwave access panel 132. The electronics access panel 126 is positioned on a right side surface of the body 123 of the microwave appliance 100. The electronics access panel 126 comprises a fan vent 128 and a duct vent 130 configured to facilitate air exchange with a surrounding environment for cooling the microwave appliance 100. The microwave access panel 132 likewise includes a fan vent (not shown) and duct vent (not shown) on a left side surface of the body 123 on the opposite side of the microwave appliance 100.

Figure 3:
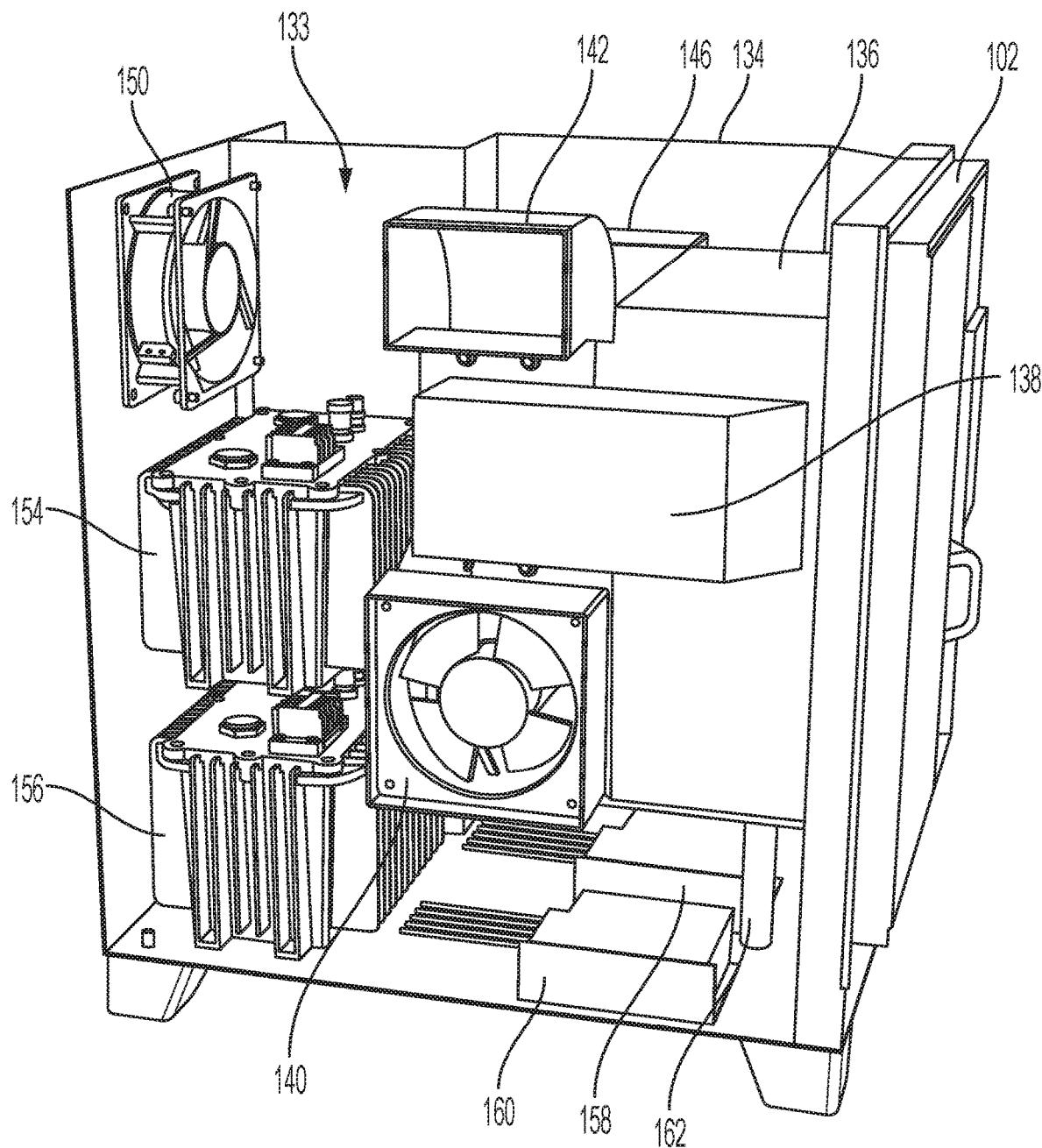
FIG. 3 is a left perspective view of the microwave appliance with the microwave access panel removed.
Figure 4:
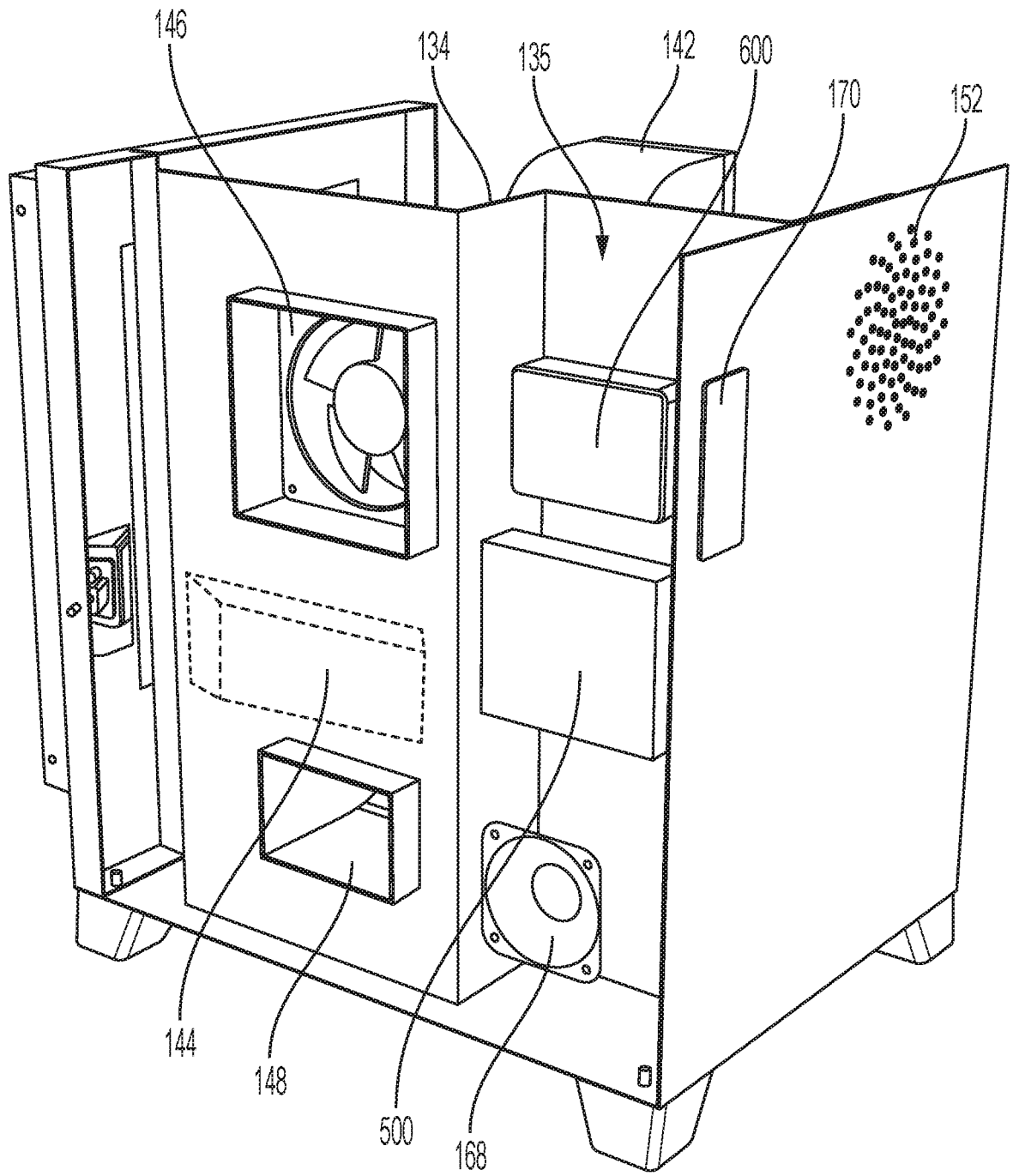
FIG. 4 is a right perspective view of the microwave appliance with the electronics access panel removed.

FIG. 3 is a left perspective view of the microwave appliance 100 with the microwave access panel 132 removed. The microwave access panel 132 provides access to a microwave compartment 133 with the microwave components of the microwave appliance 100. FIG. 4 is a right perspective view of the microwave appliance 100 with the electronics access panel 126 removed. The electronics access panel 126 provides access to an electronics compartment 135. The microwave compartment 133 and the electronics compartment 135 are separated by a partition wall 134.

The microwave compartment 133 includes a microwave chamber 136 provides an enclosed volume for receiving the holder 118. The microwave chamber 136 includes surfaces that reflect microwave radiation within the chamber 136. For example, the sides of the microwave chamber 136 may be made of a metal such as aluminum or steel. The microwave chamber 136 may include an electric field detector 538 for measuring an electric field within the microwave chamber 136. As described in more detail below, the electric field detector 538 may be used to estimate a volume of product within the food container 120.

The microwave chamber 136 receives microwave radiation from a waveguide 138 and a waveguide 144. The waveguide 144 is shown in dashed lines in FIG. 4 to illustrate that the waveguide 144 is on the other side of the partition wall 134. The waveguide 138 is positioned along a left side surface towards a top of the microwave chamber 136 relative to the waveguide 144. Likewise, the waveguide 144 is positioned along a right side surface towards a bottom of the microwave chamber 136. Therefore, the waveguide 138 is offset in a vertical direction from the waveguide 144 on the microwave chamber 136. A first magnetron (not shown) is positioned about the waveguides 138 for supplying microwave radiation to the waveguide 138. The first magnetron includes an antenna located within the waveguide 138. The waveguide 138 is configured to direct the received microwave radiation into the microwave chamber 136 along a first surface of the microwave chamber 136. Likewise, a second magnetron (not shown) is positioned about the waveguides 144 for supplying microwave radiation to the waveguide 144. The second magnetron includes an antenna located within the waveguide 144. The waveguide 144 is configured to direct the received microwave radiation into a second surface the microwave chamber 136 along a second surface of the microwave chamber 136.

Having two or more magnetrons for introducing microwave radiation at different locations in the microwave chamber 136 establishes a pattern of standing waves of constructive and/or destructive interference. By optimizing the dimensions of the microwave chamber 136 and the locations of where the microwave radiation is introduced in the microwave chamber 136, the microwave radiation may be strongly coupled to the food product in the food container 120. In other words, the optimization of the dimensions of the microwave chamber 136 minimizes reflections of microwave energy back to the magnetrons. In various implementations, the microwave appliance 100 is configured to have an efficiency greater than 90%.

While two magnetrons are disclosed, more or fewer magnetrons may be used. An additional waveguide may be provided for each such additional magnetron. Providing additional magnetrons enables the creation of more complex patterns of standing waves for ensuring strong coupling to the food product in a larger variety of food containers 120.

In some implementations, depending on the product identified by the product identification scanner 124 a power level of one or more of the magnetrons may be adjusted or turned off during use. For example, because the waveguide 138 introduces microwave radiation into the microwave chamber 136 at a location higher from the waveguide 144, if a short bottle or other food container 120 is placed in the product holder 118, then the first magnetron may be reduced or turned off during use.

While the example shown in FIG. 3 provides waveguides 138, 144 for supplying microwave radiation to the microwave chamber 136 from opposite sides of the microwave chamber 136, other configurations may be used. For example, the waveguide 138 may alternatively be located along a top surface of the microwave chamber 136 to supply microwave radiation towards a top of the food container 120 in the product holder 118. Other configurations and locations of the waveguides 138, 144 are contemplated by this disclosure.

In some implementations, a solid state microwave source may be used instead of one or more of the magnetrons. By providing a solid state microwave source, in addition to modulation of the power level of the microwave source, a frequency of the microwave radiation may be modified in use to adaptively change the pattern of standing waves generated in the microwave chamber 136. For example, the pattern of standing waves may be modified depending on the type or size of the product identified by the product identification scanner 124 to optimize the efficiency of the microwave power delivery to the food product within the food container 120.

Additionally, a simple coaxial antenna may be used with a solid state microwave source for directing microwave radiation into the microwave chamber 136, as opposed to the rigid waveguides 138, 144. Accordingly, additional locations, more than one location for each microwave source (e.g., splitting the microwave radiation from a single source across two or more antennas), or other such configurations may be used. In some implementations, a location of the coaxial antenna may also be adjustable. For example, the coaxial antenna may be mounted to a surface of the microwave chamber 136 so as to adjustably vary a depth of the antenna within the microwave chamber 136. The depth position of the antenna may be moved by a solenoid plunger, stepper motor, gear motor, or other such location adjustment mechanism. By adjusting a depth of the coaxial antenna within the microwave chamber 136, the pattern of standing waves may be modified to optimize the efficiency of the microwave appliance 100 for a particular food product and/or food container 120.

A fan 140 and duct 142 circulate air to cool the magnetron positioned about the waveguide 138 in use. For example, the fan 140 draws air in through the fan vent (not shown) on the microwave access panel 132 and directs the air past the magnetron positioned about the waveguide 138 and on out of the duct 142 to be vented to the surrounding environment. Likewise, the fan 146 may push air out through the fan vent 128, thereby causing air to be drawn into the duct 148 through the duct vent 130 and past the magnetron positioned about the waveguide 144. Additionally, a fan 150 pushes air out of a fan vent 152 on a rear surface of the body 123 of the microwave appliance 100 to provide air circulation within the microwave compartment 133, for example to cool the microwave compartment 133 from the heat generated by the various power sources 154, 156, 158, 160.

The microwave compartment 133 also includes a first magnetron power supply 154 and a second magnetron power supply 156 for powering the magnetrons positioned about the waveguides 138, 144. The magnetron power supplies 154, 156 may be a half-wave voltage doubler power supply or an inverter or switch mode power supply. The half-wave voltage doubler power supply has a fixed output and controls power by on-off cycling. The inverter or switch mode power supply is capable of continuously variable power control (as well as on-off cycling). Other power supply types may also be used.

A first electronics power supply 158 provides a first DC voltage for powering electronics in the microwave appliance 100. For example, the first DC voltage may be 12 V. A second electronics power supply 160 provides a second DC voltage for powering electronics in the microwave appliance 100. For example, the second DC voltage may be 5 V. A different number of power supplies may be used for supplying more or fewer voltage rails for powering electronics in the microwave appliance 100. Different voltage levels may also be used for one or more of the power supplies 158, 160.

A temperature sensor 162 is positioned about the bottom surface of the microwave chamber 136 and configured to measure a temperature of the food container 120 in the product holder 118 when the door 102 is closed. The temperature sensor 162 may be a contactless temperature sensor configured to sense a temperature of the packaged food product from outside of a microwave chamber. Using a contactless temperature sensor prevents interaction between the temperature sensor and microwave radiation used in heating the food product in the food container 120. For example, the temperature sensor 162 may be an infrared temperature sensor arranged to sense infrared radiation emitted by the food product in the food container 120. In another example, an ultrasound sensor may be used to sense a temperature of the packaged food product. Other contact-based or contactless temperature sensors may be used.

The food container 120 may have a variety of shapes and sizes and have product labels at different locations. The product label may insulate or otherwise impact a temperature reading for the food container 120 by the temperature sensor 162. However, the base of food containers 120 typically have less variety or variability, particularly at a central location of the base of the food container 120. For example, beverage containers typically have a flat or petaloid shaped base. Even with a petaloid shaped base, a central location of the base of the beverage container is largely uniform. Additionally, product labels are rarely located on the base of the food container 120.

The temperature sensor 162 is arranged to face towards a bottom of the product holder 118 when the door 102 is closed. The bottom of the product holder 118 may include a hole or aperture through which the temperature sensor 162 may view the base of the food container 120. Measuring the temperature from the bottom of the food container 120 allows for accurately sensing a temperature of a greater variety of package types by not needing to take into account different package sizes, shapes, and product label positions.

As best seen in FIG. 4, the electronics compartment 135 includes a computer system 600, a micro-controller assembly 500, and a speaker 168. A port access door 170 is located on the rear surface of the body 123 of the microwave appliance 100 provides access to one or more input/output (I/O) ports on the computer system 600. The partition wall 134 isolates the components in the electronics compartment 135 from heat and electromagnetic noise generated form components in the microwave compartment 133.

Figure 5:
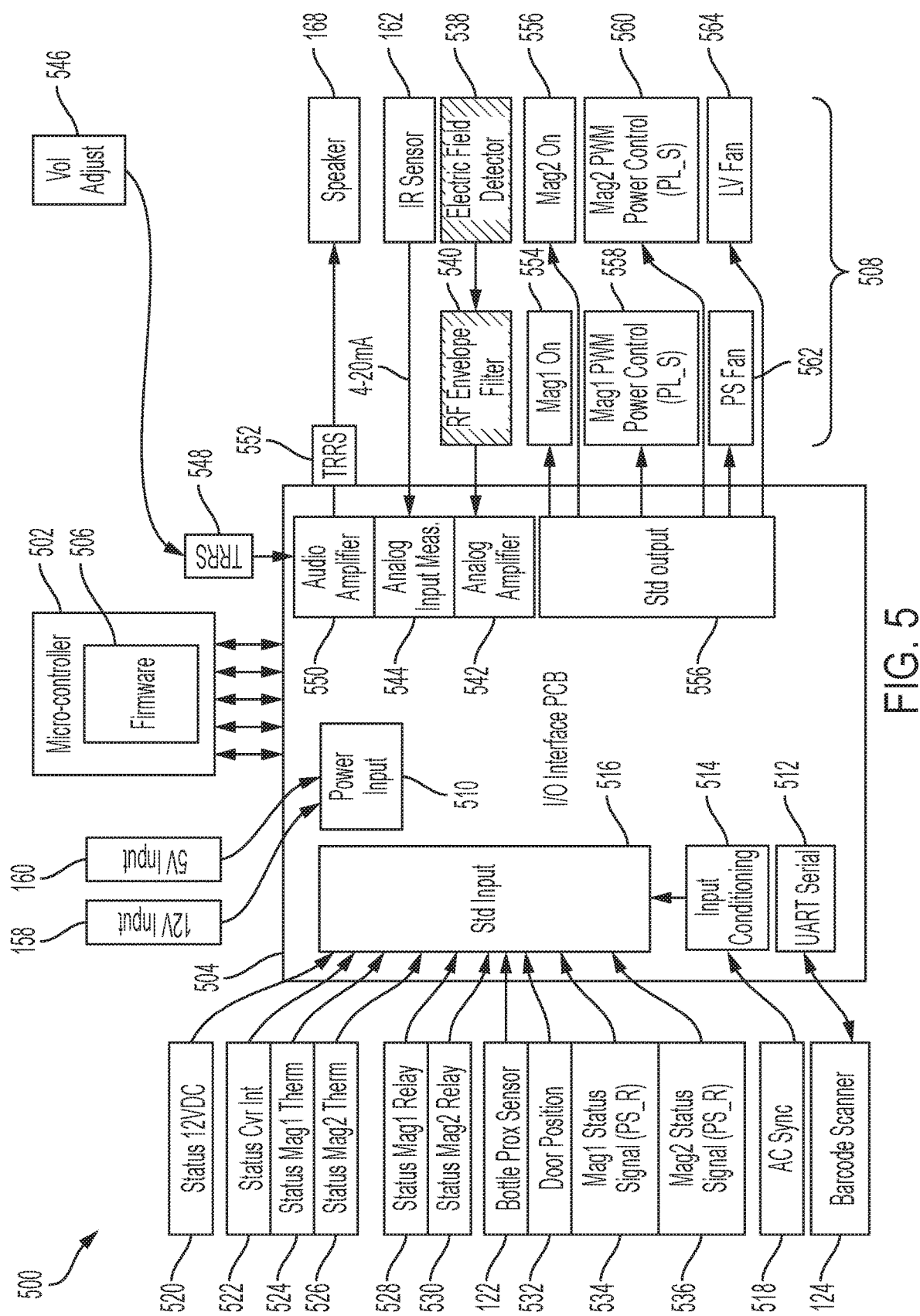
FIG. 5 is a block diagram of the micro-controller assembly of the microwave appliance.

FIG. 5 is a block diagram of the micro-controller assembly 500 of the microwave appliance 100. The micro-controller assembly 500 includes a micro-controller 502 and an I/O interface board 504. The I/O interface board 504 is configured to receive and communicate various input signals to the micro-controller 502. The micro-controller 502 includes firmware 506 for processing the received input signals and generating output control signals 508. The I/O interface board 504 supplies the output control signals 508 to control components of the microwave compartment 133.

The I/O interface board 504 includes a power input block 510 for receiving the DC voltages from the first electronics power supply 158 and the second electronics power supply 160. A universal asynchronous receiver/transmitter (UART) port 512 is configured to communicate signals with the product identification scanner 124, such as a barcode scanner. An input conditioning block 514 provides a conditioning signal to an input block 516 for processing input signals received by the input block 516. The input conditioning block 514 may receive an AC synchronous input 518.

The input block 516 is configured to receive status signals from sensors in the microwave appliance 100. For example, a voltage status sensor 520 that provides a signal to the input block 516 indicative of a status of the first electronics power supply 158. A cover interlock status sensor 522 provides a signal to the input block 516 indicative of a status (e.g., open or closed) of an interlock switch for preventing removal of microwave access panel 132 when the interlock switch is in the "closed" position. A thermal cutout sensor 524 provides a signal to the input block 516 indicative of whether a temperature of the first magnetron has reached a thermal cutout threshold. A thermal cutout sensor 526 provides a signal to the input block 516 indicative of whether a temperature of the second magnetron has reached the thermal cutout threshold. A relay status 528 provides a signal to the input block 516 indicative of a status (e.g., on or off) of a first power relay. A relay status 530 provides a signal to the input block 516 indicative of a status (e.g., on or off) of a second power relay.

The first power relay may be turned off responsive to control from a first magnetron MOSFET. The first magnetron MOSFET in turn is responsive to control from the thermal cutout sensor 524 or the cover interlock to turn off the first power relay in response to the first magnetron exceeding the thermal cutout threshold or the cover interlock opening. Likewise, the second power relay may be turned off responsive to control from a second magnetron MOSFET. The second magnetron MOSFET in turn is responsive to control from the thermal cutout sensor 526 or the cover interlock to turn off the second power relay in response to the first magnetron exceeding the thermal cutout threshold or the cover interlock opening.

The product presence detector(s) 122 provides a signal to the input block 516 indicative of whether a food container 120 is present in the product holder 118. The door switch 532 provides a signal to the input block 516 indicative of whether the door 102 is open or closed. A magnetron status sensor 534 provides a signal to the input block 516 indicative of a status of the first magnetron power supply 154. A magnetron status sensor 536 provides a signal to the input block 516 indicative of a status of the second magnetron power supply 156. More or fewer input signals may be provided to the input block 516.

The I/O interface board 504 also receives analog inputs from the temperature sensor 162 and an electric field detector 538. A signal from the electric field detector 538 may pass through a radio frequency envelope filter 540 prior to being received by an analog amplifier 542 on the I/O interface board 504. An analog input 544 on the I/O interface board 504 receives a signal from the temperature sensor 162 indicative of a temperature of the food container 120.

As noted above, the electric field detector 538 may be used to estimate a volume of product within the food container 120. Additionally, the electric field detector 538 may be used to verify that electric fields within the microwave chamber 136 are in an expected range of normal operation. For example, if a metallic food container 120, such as a 12 oz. aluminum can, were inserted into the microwave appliance 100, the electric field detector 538 would sense a lower than expected or zero value load. At the same time, the product presence detector(s) 122 would sense that the food container 120 is present in the product holder 118. Similarly, if no product were inserted into the microwave appliance 100, the electric field detector 538 would sense a lower than expected or zero value load. The product presence detector(s) 122 would also sense that no product is present in the product holder 118. In either case, operation of the microwave appliance 100 may be prevented from being started or otherwise terminated upon the electric field detector 538 sensing a load value below an allowable minimum as indicated by a maximum allowable electric field threshold value.

The maximum electric field threshold value may correspond to a minimum amount of volume of a given type of food product in a given food container 120. For example, the maximum threshold value may be an expected electric field reading that corresponds to at least 5%, 10%, or 25% of a volume of a given food container 120 for the type of food product contained in the given food container 120.

Different materials have different dielectric constants and electrical conductivity thus couple to, absorb, or otherwise react to microwave radiation differently. For example, the dielectric constant of PET is about 1-3 $\epsilon'$ whereas water has a dielectric constant of about 80 $\epsilon'$. Likewise, the electrical conductivity of PET is about $10^{-21}$ S/m, whereas saline water solutions have an electrical conductivity of around 1-5 S/m. Therefore, food products much more readily absorb microwave radiation than the containers in which they are typically contained.

However, different food products have different electrical properties. Based upon the electrical properties (e.g., dielectric constant and/or electrical conductivity) of the food product being inserted into the microwave chamber 136, such as based on a reading from the product identification scanner 124, and a detected electric field strength measured by the electric field detector 538, a volume of the food product may be estimated. Using the estimated volume of food product inserted into the microwave chamber 136, operation of the first magnetron power supply 154 and/or the second magnetron power supply 156 may be modified. For example, a power level of one or more of the magnetron power supplies 154, 156 may be adjusted based on the estimated volume to avoid flash boiling or otherwise reduce a risk of pressure buildup in the food container 120. Therefore, even partially full food containers 120 may be safely heated to a target temperature in the microwave appliance 100.

A volume adjustment input 546 (e.g., volume knob or button) may be positioned within the electronics compartment 135 or other location within the microwave appliance for allowing a technician to adjust a volume level of the speaker 168. The volume adjustment input 546 may be provided through an audio jack 548 to an audio amplifier 550 on the I/O interface board 504 to adjust an amount of amplification provided by the audio amplifier 550. An output audio jack 552 supplies audio signals from the audio amplifier 550 to the speaker 168.

The I/O interface board 556 also includes an output block 556 for supplying output control signals 508 to components in the microwave compartment 133. A first magnetron signal 554 is provided to the first magnetron MOSFET to turn on or off the first power relay. Likewise, a second magnetron signal 556 is provided to the second magnetron MOSFET to turn on or off the second power relay. Upon the first power relay being turned on, power is provided to the first magnetron power supply 154 and the fan 140. Upon the second power relay being turned on, power is provided to the second magnetron power supply 156 and the fan 146.

A first power control signal 558 is provided to the first magnetron power supply 154 to modulate the power output by the first magnetron power supply 154 to the first magnetron. A second power control signal 560 is provided to the second magnetron power supply 156 to modulate the power output by the second magnetron power supply 156 to the second magnetron. In some implementations, the first and second power control signals 558, 560 are pulse width modulated control signals. The first and second power control signals 558, 560 may be the same or different. For example, the first and second magnetron power supplies 154, 156 may be operated to provide different power levels to their respective magnetrons. A fan control signal 562 is provided to the fan 150 to cool the microwave compartment 133. A fan control signal 564 may be provided to the fans 140, 146 to cool the first and second magnetrons.

Figure 6:
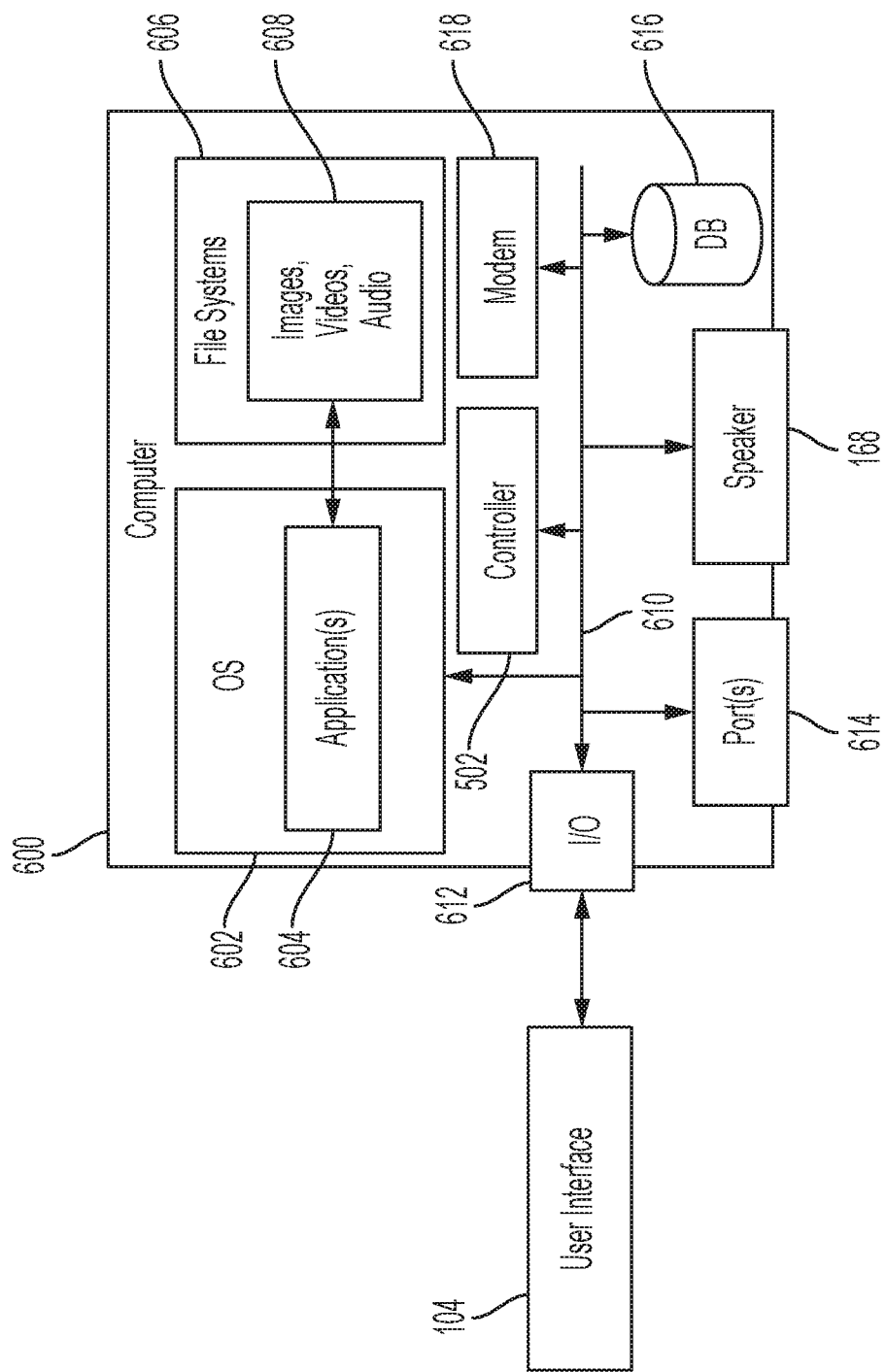
FIG. 6 is a block diagram of the computer system of the microwave appliance.

FIG. 6 is a block diagram of the computer system 600 of the microwave appliance 100. The computer system 600 includes an operating system 602 and one or more applications 604 installed on the operating system 602. The computer 600 also includes a memory 606 with a file system for storing images, audio, and video data 608 for display on the user interface 104 or output from the speaker 168. The one or more applications 604 control operation of components on a communications bus 610, such as the micro-controller 502. An I/O interface 612 provides communication between the one or more applications 604 and the user interface 104, for example supplying video or image data and receiving touch inputs from a touchscreen. A port 614, which may be accessible via the port access door 170, provides access to technicians to download usage and diagnostic data as well as to upload software updates for the application(s) 604 or the firmware 506. A database 616 may locally store the usage and diagnostic data for the microwave appliance 100. For example, the usage data may include how many times the door 102 is opened, which products are scanned by the product identification scanner 124, what temperature is selected on the user interface 104 to heat the products, and when each of these events occur. Other usage data may be collected. Diagnostic data may include logs of the inputs received on the input block 516, the analog input 544, and the analog amplifier 542 as well as the control signals 508. Other diagnostic data may be stored in the database 616. A modem 618 may also be included for uploading the usage and diagnostic data to a remote server (not shown) or for receiving software updates from the remote server. Other configurations and components are contemplated by this disclosure.

Figure 7A:
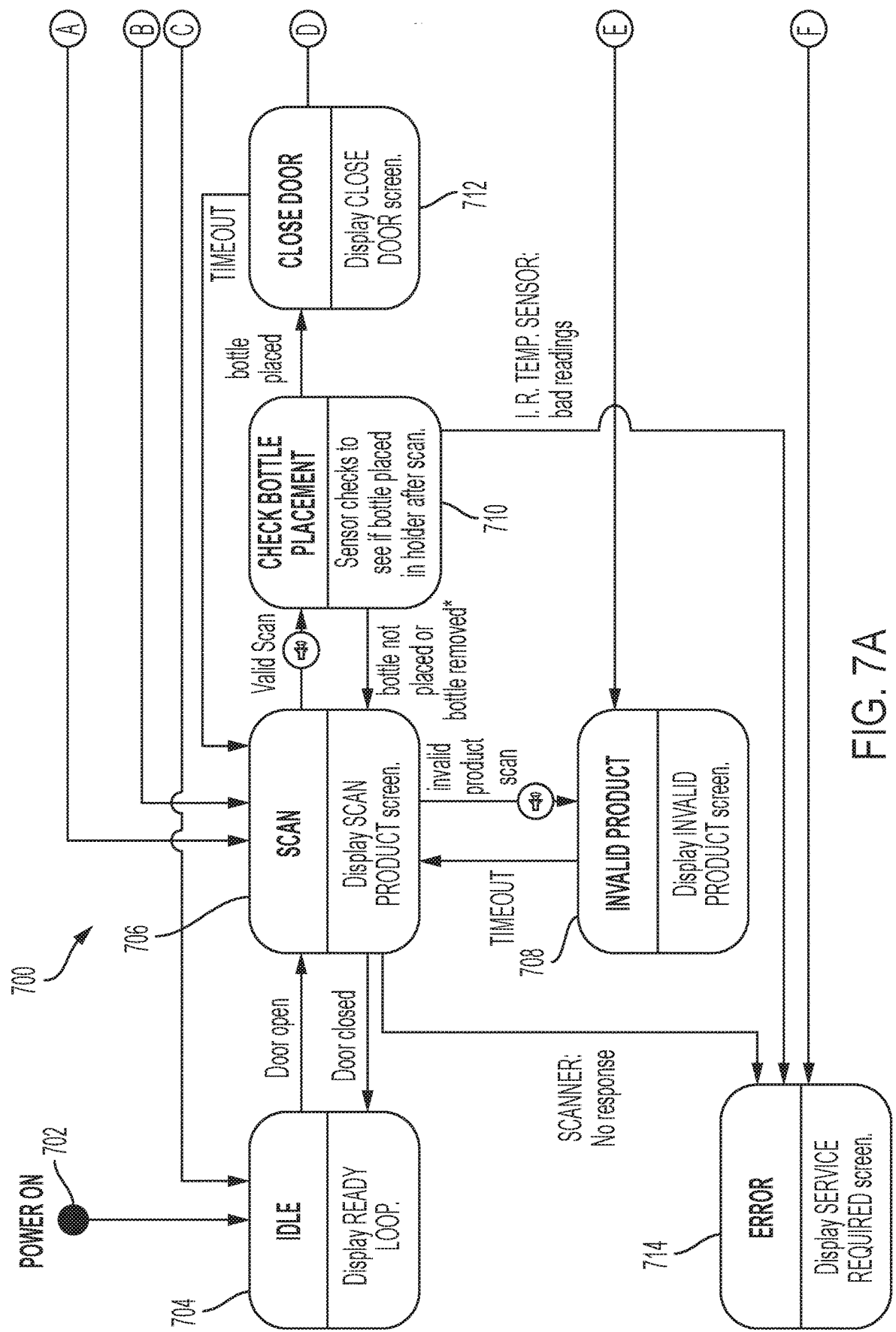
FIG. 7 is a state diagram for operation of the microwave appliance by a consumer.
Figure 7B:
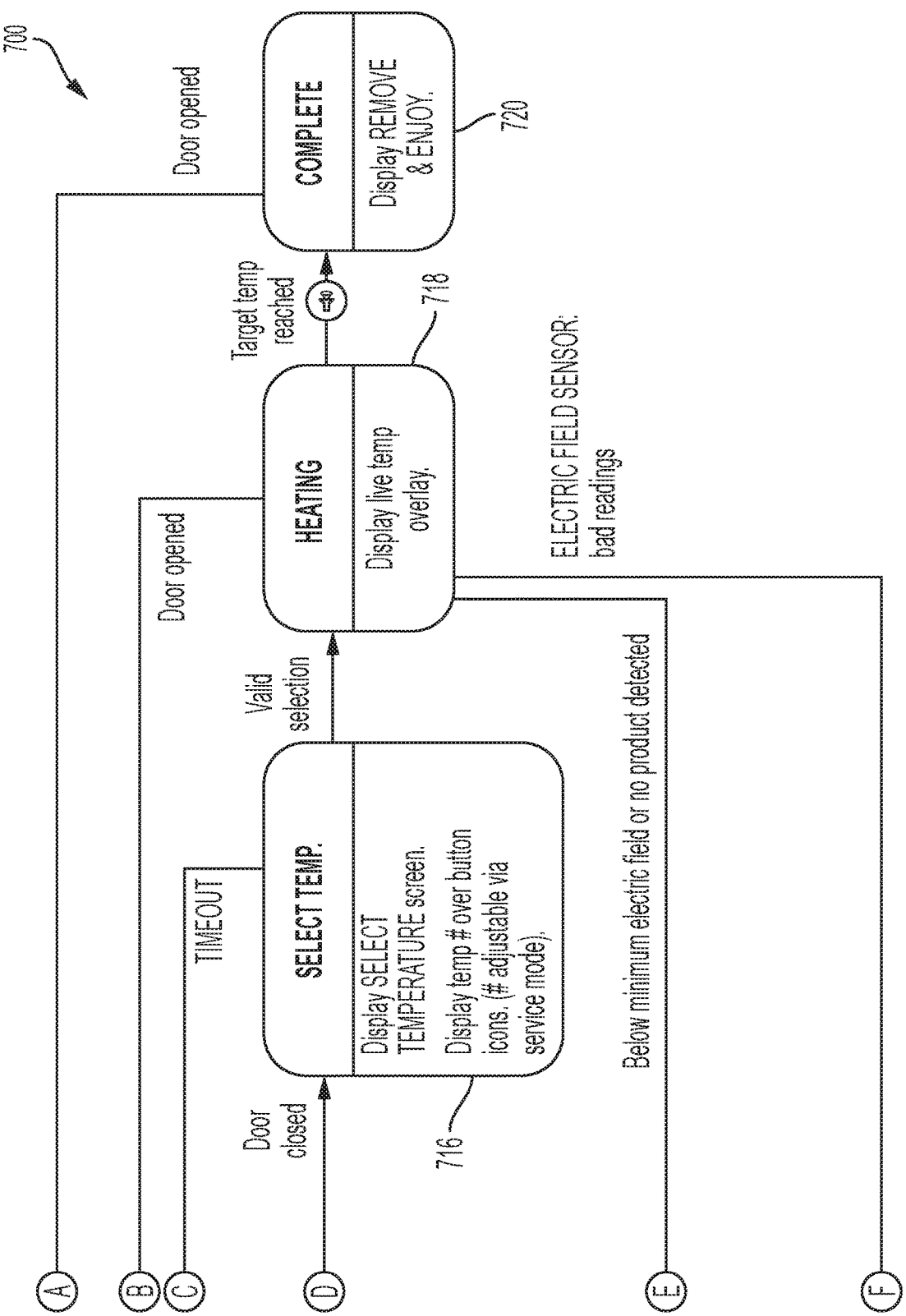

FIG. 7 is a state diagram 700 for operation of the microwave appliance 100 by a consumer. FIGS. 8A-8F are user interface screens displayed on the user interface 104 of the microwave appliance 100 during operation by the consumer. At 702, the microwave appliance 100 receives power. At 704, the microwave appliance 100 enters an idle state 704. In the idle state 704, the user interface 104 may display a ready screen or video to communicate to the consumer that the microwave appliance is ready for use. Upon the door 102 being opened as detected by the door switch 532, the microwave appliance enters a scan state 706.

In the scan state 706, the user interface 104 may display a scan screen or video to communicate to the consumer to scan the food container 120 with the product identification scanner 124. For example, the user interface 104 may display the user interface screen shown in FIG. 8A. If the door 102 is closed as detected by the door switch 532 before a food container 120 is scanned by the product identification scanner 124, then the microwave appliance 100 returns to the idle state 704.

If an invalid product is scanned by the identification scanner 124, then audio feedback may be provided through the speaker 168 and the microwave appliance 100 enters an invalid product state 708 in which the user interface 104 may display an invalid product screen or video to communicate to the consumer that the scanned food container 120 is invalid for use with the microwave appliance 100. For example, the user interface 104 may display the user interface screen shown in FIG. 8C. This check ensures that food containers 120 with an incompatible container material (e.g., aluminum can, etc.), an incompatible type of food product (e.g., highly carbonated beverage, etc.), or otherwise not registered with the microwave appliance 100 are prevented for use with the microwave appliance 100. After a timeout period, the microwave appliance returns to the scan state 706.

If a valid product is scanned by the identification scanner 124, then audio feedback may be provided through the speaker 168 and the microwave appliance 100 enters a check food container placement state 710. In the check food container placement state 710, the microwave appliance 100 verifies the presence of the food container 120 in the product holder 118 with the product presence detector(s) 122. If the food container 120 is not detected to be present in the product holder 118 or is removed from the product holder 118 during the check food container placement state 710, then the microwave appliance 100 returns to the scan state 706. If the food container 120 is detected to be present in the product holder 118, then the microwave appliance 100 enters the closed door state 712.

In the close door state 712, the user interface 104 may display a closed door screen or video to communicate to the consumer that product is valid, correctly placed, and that the consumer should close the door 102. For example, the user interface 104 may display the user interface screen shown in FIG. 8B. If the door 102 is not detected to be closed within a timeout period, then the microwave appliance 100 returns to the scan state 706. Upon the microwave appliance 100 detecting that the door 102 has been closed as detected by the door switch 532, the microwave appliance 100 enters the select temperature state 716.

Additionally, upon detecting that the door 102 has been closed, an initial temperature reading of the food container 120 may be detected by the temperature sensor 162. If an invalid temperature reading is received, the microwave appliance 100 enters an error state 714. For example, the microwave appliance 100 may enter the error state 714 if the temperature reading of the food container 120 is at or above a maximum temperature for the microwave appliance 100 or the temperature reading is other wise outside of a normal range of operation for the temperature sensor 162 or otherwise indicative of the temperature sensor 162 being faulty. In the error state 714, the user interface 104 may display an error screen or video to communicate to the consumer that service is required. For example, the user interface 104 may display the user interface screen shown in FIG. 8F.

Figure 8A:
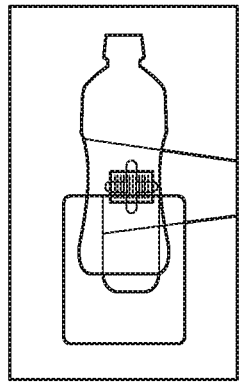
FIGS. 8A-8F are user interface screens displayed on the user interface of the microwave appliance during operation by a consumer.
Figure 8B:
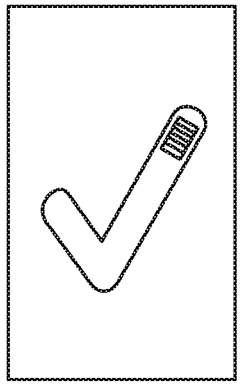
Figure 8C:
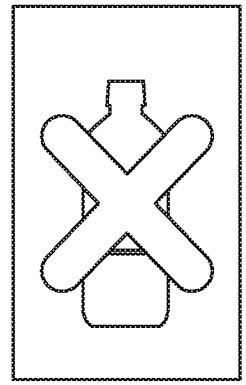
Figure 8D:
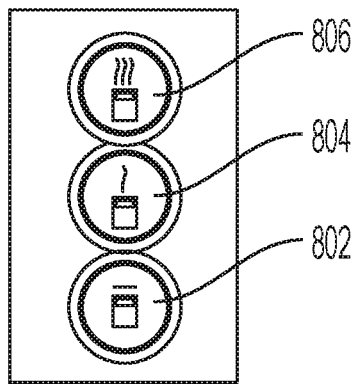
Figure 8E:
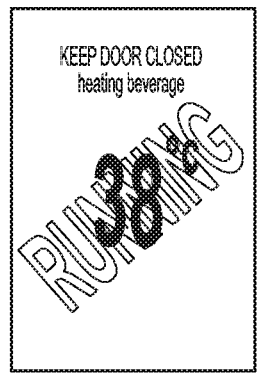
Figure 8F:
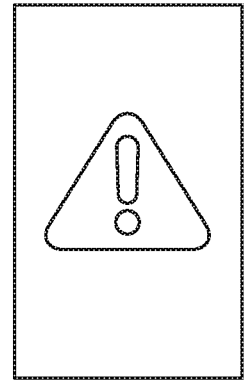

In the select temperature state 716, the user interface 104 may display a select temperature screen or video to communicate to the consumer to select a desired heating temperature for the food container 120. For example, the user interface 104 may display the user interface screen shown in FIG. 8D. As shown in FIG. 8D there are three selectable user interface icons, each representing a relative temperature level, such as an ambient icon 802, a hot icon 804, and very hot icon 806. Alternatively or additionally, a temperature value may be displayed on each of the selectable icons.

A consumer may select the ambient icon 802 to heat a chilled food container 120 to ambient temperatures (e.g., ~25° C.). A consumer may select the hot icon 804 to heat a food container 120 to a configurable hot temperature (e.g., ~45° C.). A consumer may select the very hot icon 806 to heat a food container 120 to a configurable very hot temperature (e.g., ~65° C.). Other temperature levels may be used and may be configured by a technician as disclosed in more detail below. If a temperature selection is not made within a timeout period, the microwave appliance returns to the scan state 706.

Upon receiving a temperature selection from the user interface 104, the microwave appliance 100 enters the heating state 718. In the heating state 718, the microwave appliance commences with heating the food container 120 through operation of the one or more microwave sources, as described above. During the heating state 718, the user interface 104 may display a heating screen or video to communicate to the consumer a current status of heating the food container 120. For example, the user interface 104 may display the user interface screen shown in FIG. 8E. Accordingly, the user interface 104 may display a current temperature of the food container 120 as well as an indication that the microwave appliance 100 is running an that the door 102 should remain closed. If the door 102 is opened during the heating state 718 as detected by the door switch 532, the microwave appliance 100 discontinues operation of the microwave sources and returns to the scan state 706.

Readings from the electric field detector 538 may be collected during operation of the microwave appliance 100. As discussed above, these readings may be used to verify that a product has been inserted into the microwave chamber 136 or detect a volume of fluid in the food container 120. For example, a power level or frequency of one or more microwave sources may be modulated based on the detected volume of fluid in the food container 120. If the electric field detected by the electric field detector 538 is greater than the maximum electric field threshold or if no product is detected in the microwave chamber 136 by the product presence detector(s) 122, then the microwave appliance 100 enters the invalid product state 708, described above. If values from the electric field detector 538 are outside of a normal range of operation or otherwise indicative of the microwave appliance 100 being faulty, the microwave appliance 100 enters the error state 714, described above.

Upon reaching a target temperature based on the selection from the user interface 104, the microwave appliance 100 discontinues operation of the microwave sources, provides audio feedback through the speaker 168, and enters a complete state 720. In the complete state 770, the user interface 104 may display a complete screen or video to communicate to the consumer to remove and enjoy consumption of the heated food container 120. For example, the user interface 104 may display the user interface screen shown in FIG. 8B. Upon the door 102 being opened during the complete state 720 as detected by the door switch 532, the microwave appliance 100 returns to the scan state 706.

In some implementations, upon the door 102 being opened during the complete state 720 or during the heating state 718, the microwave appliance 100 may enter a remove bottle state (not shown). In the remove bottle state, the user interface 104 may display a remove bottle screen or video to communicate to the consumer to remove the food container 120 from the product holder 118. The remove bottle screen or video may be displayed for a predetermined amount of time. Upon the food container 120 being removed from the product holder 118 as detected by the product presence detector(s) 122 or after a timeout period, the microwave appliance 100 returns to the scan state 706.

Figure 9:
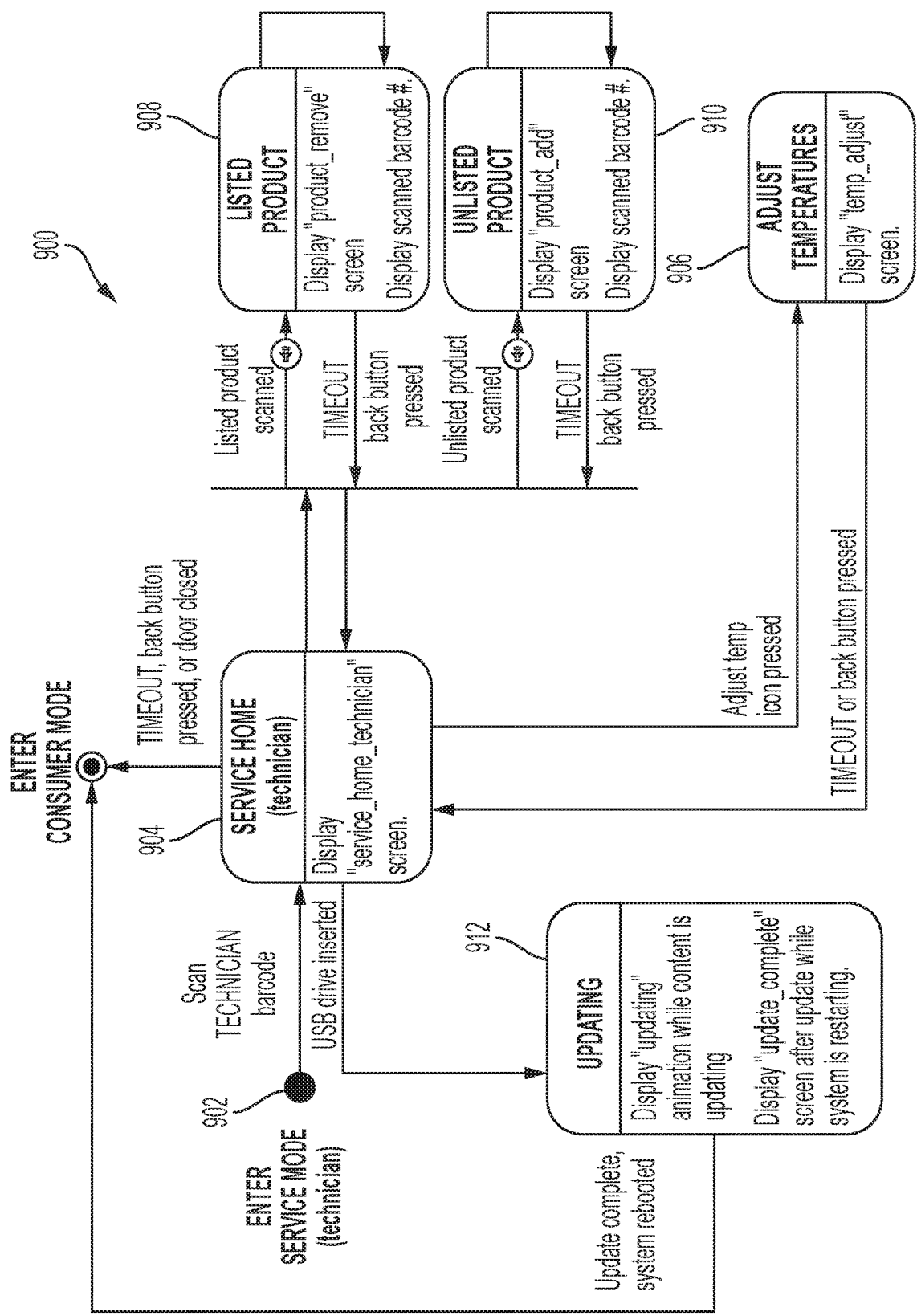
FIG. 9 is state diagram for operation of the microwave appliance by a technician.
Figure 10B:
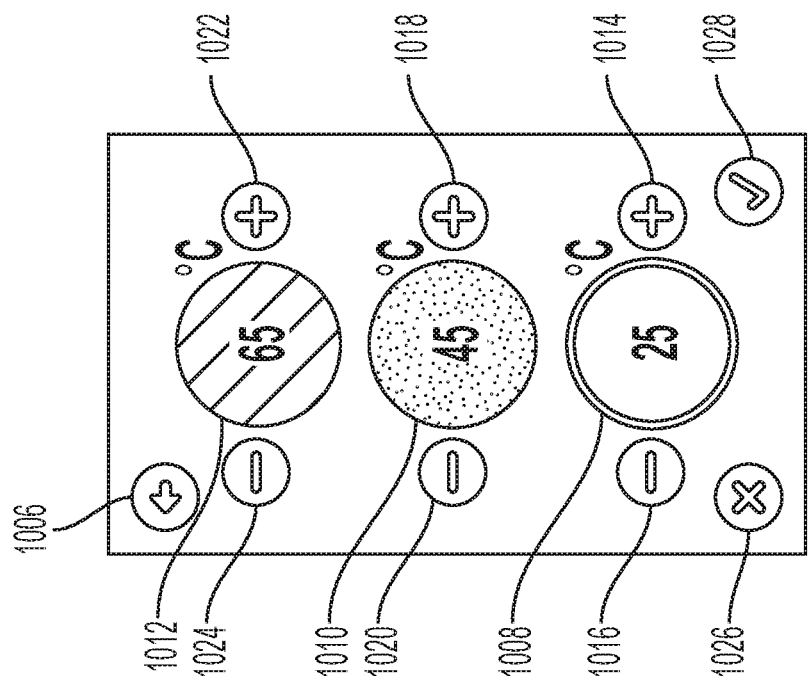
FIGS. 10A-10B are user interface screens displayed on the user interface of the microwave appliance during operation by a technician.
Figure 10A:
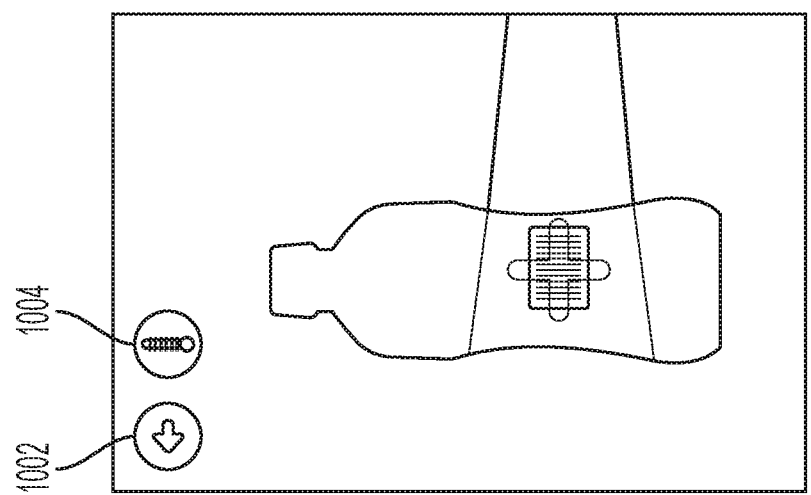

FIG. 9 is state diagram 900 for operation of the microwave appliance 100 by a technician. FIGS. 10A-10B are user interface screens displayed on the user interface of the microwave appliance 100 during operation by the technician. At 902, the microwave appliance 100 enters a service home state 904. For example, upon the product identification scanner 124 scanning a technician barcode in the scan state 706, the microwave appliance 100 enters the service home state 904. In the service home state 904, the user interface 104 may display a service home screen or video to communicate service options to the technician.

For example, the user interface 104 may display the user interface screen shown in FIG. 10A in the service home state 904. The service home screen includes a selectable back button 1002. Upon receiving a selection of the back button 1002, after a timeout period, or upon the door 102 being closed during the service home state 904 as detected by the door switch 532, the microwave appliance 100 returns to the consumer mode of operation. For example, the microwave appliance 100 returns to the idle state 704 or the scan state 706 depending on whether the door 102 is closed.

The service home screen also includes a selectable temperature button 1004. Upon receiving a selection of the temperature button 1004, the microwave appliance 100 enters an adjust temperature state 906. In the adjust temperature state 906, the user interface 104 may display an adjust temperature screen or video to communicate temperature adjustment options to the technician.

For example, the user interface 104 may display the user interface screen shown in FIG. 10B in the adjust temperature state 906. The adjust temperature screen includes a selectable back button 1006. Upon receiving a selection of the back button 1006 or after a timeout period, the microwave appliance 100 returns to the service home state 904. The adjust temperature screen also includes temperature icons 1008, 1010, 1012 that correspond with the ambient icon 802, hot icon 804, and very hot icon 806, respectively, but with an overlaid temperature value. Each of the temperature icons 1008, 1010, 1012 have corresponding temperature adjustment buttons to change the temperature value corresponding to the temperature icon.

For example, temperature icon 1008, corresponding to the ambient icon 802, is shown with a temperature value of 25° C. The temperature value in the temperature icon 1008 may be increased upon selection of an increase temperature button 1014. Likewise, the temperature value in the temperature icon 1008 may be decreased upon selection of a decrease temperature button 1016. Temperature icon 1010, corresponding to the hot icon 804, is shown with a temperature value of 45° C. The temperature value in the temperature icon 1010 may be increased upon selection of an increase temperature button 1018. Likewise, the temperature value in the temperature icon 1010 may be decreased upon selection of a decrease temperature button 1020. Temperature icon 1012, corresponding to the very hot icon 806, is shown with a temperature value of 65° C. The temperature value in the temperature icon 1012 may be increased upon selection of an increase temperature button 1022. Likewise, the temperature value in the temperature icon 1012 may be decreased upon selection of a decrease temperature button 1024. The increase and decrease temperature buttons 1014, 1016, 1018, 1020, 1022, 1024 may adjust the temperature value in the temperature icons 1008, 1010, 1012 by whole number (e.g., 1, 2, 3, 4, or 5° C. for each selection) or fractional number values (e.g., 0.1, 0.2, 0.3, 0.4, 0.5° C. for each selection).

The adjust temperature screen also includes a cancel button 1026 and a save button 1028. Upon selection of the cancel button 1026, any changes to the temperature values in the temperature icons 1008, 1010, 1012 are discarded and the microwave appliance 100 returns to the service home state 904. Likewise, upon selection of the save button 1028, any changes to the temperature values in the temperature icons 1008, 1010, 1012 are saved and the microwave appliance 100 returns to the service home state 904.

From the service home state 904, the technician can modify an inventory of acceptable food containers for use with the microwave appliance 100 by scanning a food container 120 in which a modification is desired. For example, the technician may scan the food container 120 with the product identification scanner 124 at which point the microwave appliance provides audio feedback of the scan through the speaker 168. If the scanned food container 120 is already stored in the inventor of acceptable food containers, the microwave appliance 100 enters a listed product state 908. If the scanned food container 120 is not already stored in the inventor of acceptable food containers, the microwave appliance 100 enters an unlisted product state 910. Regardless, the user interface 104 may display a value of the scanned identifier (e.g., barcode number, etc.) or other information about the scanned food container 120, such as the type of product, etc.

In the listed product state 908, the user interface 104 may display a remove product screen or video to communicate options to the technician for modifying the inventory of acceptable food containers. For example, the remove product screen may include a selectable confirmation icon for confirming that the scanned food container 120 should be removed from the inventory of acceptable food containers. Upon receiving a selection of the confirmation icon, the scanned food container 120 is removed from the inventory of acceptable food containers and the microwave appliance 100 returns to the service home state 904. The remove product screen may also include a selectable back button for canceling removal of the scanned food container 120 from the inventory of acceptable food containers. After a timeout period or upon receiving a selection of the back button, the inventory of acceptable food containers remains unchanged and the microwave appliance 100 returns to the service home state 904.

In the unlisted product state 910, the user interface 104 may display an add product screen or video to communicate options to the technician for modifying the inventory of acceptable food containers. For example, the add product screen may include a selectable confirmation icon for confirming that the scanned food container 120 should be added to the inventory of acceptable food containers. Upon receiving a selection of the confirmation icon, the scanned food container 120 is added to the inventory of acceptable food containers and the microwave appliance 100 returns to the service home state 904. The add product screen may also include a selectable back button for canceling addition of the scanned food container 120 from the inventory of acceptable food containers. After a timeout period or upon receiving a selection of the back button, the inventory of acceptable food containers remains unchanged and the microwave appliance 100 returns to the service home state 904.

In some implementations, the technician can be provided more access to modify the inventory of acceptable food containers than a crew member or other individual with access to the service home state 904. For example, the crew member may be able to add or remove some food containers from the inventory of acceptable food containers. However, there may be a subset of the inventory of acceptable food containers for which the crew member is not be provided access to remove. If the scanned food container 120 is in the subset of the inventor of acceptable food containers for which the crew member is not be provided access to remove, the user interface 104 may simply display a product screen that shows additional information about the scanned food container.

From the service home state 904, the technician can also perform software update operations on the microwave appliance 100. For example, upon receiving a USB drive into the port 614, the microwave appliance 100 enters an updating state 912. In the updating state 912, the user interface 104 may display an updating screen or video to communicate to the technician that software on the microwave appliance 100 is updating. For example, the software update may upload and install software updates for the application(s) 604 or the firmware 506. Upon completion of the software update, the user interface 104 may display an update complete screen to communicate to the technician that the software update has completed. The microwave appliance 100 may then restart as normal from the power state 702.

It should be appreciated that the logical operations described herein with respect to the various figures may be implemented (1) as a sequence of computer implemented acts or program modules (i.e., software) running on a computing device (e.g., the computing device described in FIG. 11), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 11:
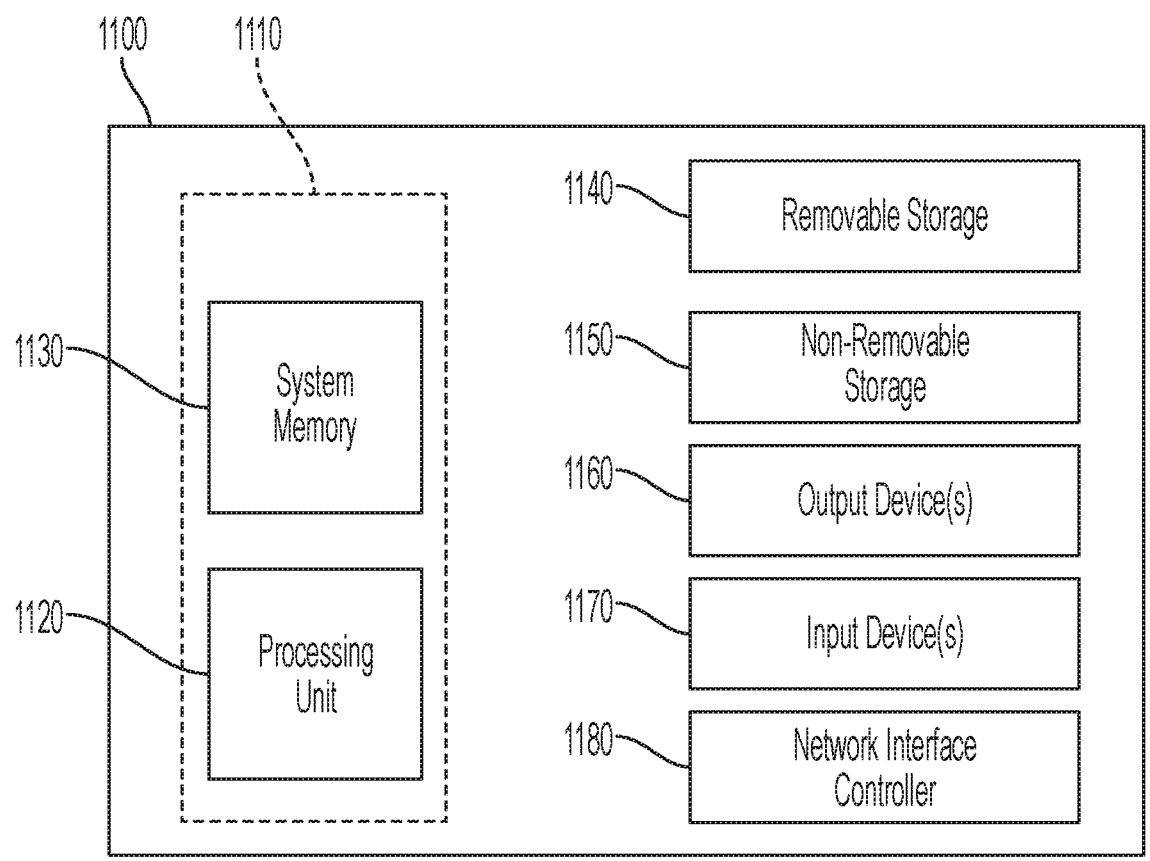
FIG. 11 illustrates an exemplary computer system suitable for implementing the several embodiments of the disclosure.

Referring to FIG. 11, an example computing device 1100 upon which embodiments of the invention may be implemented is illustrated. For example, the microwave appliance 100, user interface 104, micro-controller 502, and/or computer 600 described herein may each be implemented as a computing device, such as computing device 1100. It should be understood that the example computing device 1100 is only one example of a suitable computing environment upon which embodiments of the invention may be implemented. Optionally, the computing device 1100 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In an embodiment, the computing device 1100 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computing device 1100 to provide the functionality of a number of servers that is not directly bound to the number of computers in the computing device 1100. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In its most basic configuration, computing device 1100 typically includes at least one processing unit 1120 and system memory 1130. Depending on the exact configuration and type of computing device, system memory 1130 may be volatile (such as random access memory (RAM)), non-volatile (such as read-only memory (ROM), flash memory, etc.), or some combination of the two. This most basic configuration is illustrated in FIG. 11 by dashed line 1110. The processing unit 1120 may be a standard programmable processor that performs arithmetic and logic operations necessary for operation of the computing device 1100. While only one processing unit 1120 is shown, multiple processors may be present. Thus, while instructions may be discussed as executed by a processor, the instructions may be executed simultaneously, serially, or otherwise executed by one or multiple processors. The computing device 1100 may also include a bus or other communication mechanism for communicating information among various components of the computing device 1100.

Computing device 1100 may have additional features/functionality. For example, computing device 1100 may include additional storage such as removable storage 1140 and non-removable storage 1150 including, but not limited to, magnetic or optical disks or tapes. Computing device 1100 may also contain network connection(s) 1180 that allow the device to communicate with other devices such as over the communication pathways described herein. The network connection(s) 1180 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. Computing device 1100 may also have input device(s) 1170 such as a keyboards, keypads, switches, dials, mice, track balls, touch screens, voice recognizers, card readers, paper tape readers, or other well-known input devices. Output device(s) 1160 such as a printers, video monitors, liquid crystal displays (LCDs), touch screen displays, displays, speakers, etc. may also be included. The additional devices may be connected to the bus in order to facilitate communication of data among the components of the computing device 1100. All these devices are well known in the art and need not be discussed at length here.

The processing unit 1120 may be configured to execute program code encoded in tangible, computer-readable media. Tangible, computer-readable media refers to any media that is capable of providing data that causes the computing device 1100 (i.e., a machine) to operate in a particular fashion. Various computer-readable media may be utilized to provide instructions to the processing unit 1120 for execution. Example tangible, computer-readable media may include, but is not limited to, volatile media, non-volatile media, removable media and non-removable media implemented in any method or technology for storage of information such as computer readable instructions, data structures, program modules or other data. System memory 1130, removable storage 1140, and non-removable storage 1150 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

In an example implementation, the processing unit 1120 may execute program code stored in the system memory 1130. For example, the bus may carry data to the system memory 1130, from which the processing unit 1120 receives and executes instructions. The data received by the system memory 1130 may optionally be stored on the removable storage 1140 or the non-removable storage 1150 before or after execution by the processing unit 1120.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Embodiments of the methods and systems may be described herein with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A microwave appliance, comprising:
   a plurality of microwave sources;
   a microwave chamber in electromagnetic communication with the plurality of microwave sources;
   a product holder configured to support a food container within the microwave chamber;
   a temperature sensor configured to sense a temperature of the food container supported within the product holder;
   a user interface configured to receive a temperature selection;
   a controller in communication with the temperature sensor and the user interface configured to operate the plurality of microwave sources to heat a food product in the food container to a temperature corresponding to the temperature selection;
   an electric field detector in communication with the controller, the electric field detector configured to detect an electric field in the microwave chamber; and
   a product identification scanner in communication with the controller and configured read an identifier on the food container,
   wherein the controller is configured to estimate a volume of the food product in the microwave chamber based on a reading from the electric field detector and a reading of the identifier from the product identification scanner.

2. The microwave appliance of claim 1,
   wherein the electric field detector is used to verify that the electric field in the microwave chamber is within an expected range of normal operation, where the expected range of normal operation is determined based the identifier on the food container read by the product identification scanner.

3. The microwave appliance of claim 1, wherein the controller is configured to determine whether the electric field in the microwave chamber is less than a maximum electric field threshold value.

4. The microwave appliance of claim 1, wherein the product identification scanner is an optical scanner or a wireless tag reader.

5. The microwave appliance of claim 4, wherein the optical scanner is a camera or barcode reader.

6. The microwave appliance of claim 1, wherein the temperature sensor is positioned beneath the product holder and configured to sense a temperature of a base of the food container.

7. The microwave appliance of claim 1, wherein the temperature sensor is an infrared or ultrasonic temperature sensor.

8. The microwave appliance of claim 1, further comprising:
   a plurality of power supplies, each corresponding to one of the plurality of microwave sources, and each in communication with the controller, wherein the controller is further configured to modulate a power level of microwaves generated by the plurality of microwave sources.

9. The microwave appliance of claim 8, wherein the controller modulates the power level of microwaves generated by the plurality of microwave sources based on the estimated volume of the food product in the microwave chamber.

10. The microwave appliance of claim 1, wherein one or more of the plurality of microwave sources is a magnetron or a solid-state microwave source.

11. The microwave appliance of claim 10, wherein the controller is further configured to modulate a frequency of microwave generated by the solid-state microwave source.

12. A method of operating a microwave appliance, comprising:
- identifying a food container based on scanning an identifier on the food container by a product identification scanner;
- receiving a temperature selection from a user interface;
- powering a plurality of microwave sources to heat a food product in the food container within a microwave chamber;
- detecting an electric field in the microwave chamber with an electric field detector;
- estimating a volume of the food product in the microwave chamber based on the electric field detected by the electric field detector and the identification of the food container;
- sensing a temperature of the food container with a temperature sensor; and
- turning off power to the plurality of microwave sources upon the temperature of the food container reaching the temperature selection.

13. The method of claim 12, further comprising:
- determining whether the electric field in the microwave chamber is greater than a maximum electric field threshold value.

14. The method of claim 12, further comprising:
- modifying a power level of one or more of the plurality of microwave sources based on the estimated volume of the food product.

15. The method of claim 12, wherein the temperature sensor is positioned beneath the food container in the microwave chamber and is configured to sense the temperature of a base of the food container.

16. The method of claim 12, wherein the product identification scanner is an optical scanner or a wireless tag reader.

17. The method of claim 12, wherein one or more of the plurality of microwave sources is a magnetron or a solid-state microwave source.

18. The method of claim 12, wherein the electric field detector is used to verify that the electric field in the microwave chamber is within an expected range of normal operation.

* * * * *